(12) United States Patent
Morizet et al.

(10) Patent No.: US 7,855,664 B2
(45) Date of Patent: Dec. 21, 2010

(54) DISPLAY SYSTEM FOR AIRCRAFT

(75) Inventors: Benoit Morizet, Toulouse (FR); Vincent Amade, Colomiers (FR); Patrick Morere, Paris (FR); Pierre Gamet, Blagnac (FR)

(73) Assignee: Airbus France, Toulouse (FR)

( * ) Notice: Subject to any disclaimer, the term of this patent is extended or adjusted under 35 U.S.C. 154(b) by 667 days.

(21) Appl. No.: 11/573,842

(22) PCT Filed: Jul. 27, 2005

(86) PCT No.: PCT/FR2005/001951

§ 371 (c)(1),
(2), (4) Date: Feb. 16, 2007

(87) PCT Pub. No.: WO2006/024746

PCT Pub. Date: Mar. 9, 2006

(65) Prior Publication Data

US 2007/0247336 A1    Oct. 25, 2007

(30) Foreign Application Priority Data

Aug. 19, 2004 (FR) .................................. 04 08975

(51) Int. Cl.
*G08B 21/00* (2006.01)
*G05D 1/00* (2006.01)
*G06G 7/70* (2006.01)
*G06G 7/76* (2006.01)

(52) U.S. Cl. ............................. 340/945; 701/1; 701/3; 701/120; 701/207; 701/300

(58) Field of Classification Search ................. 340/945, 340/961, 970, 973–979; 701/1–124, 200–302; 348/143, 144
See application file for complete search history.

(56) References Cited

U.S. PATENT DOCUMENTS

| | | | | |
|---|---|---|---|---|
| 3,886,306 A | * | 5/1975 | Fayard et al. | 348/117 |
| 3,947,809 A | * | 3/1976 | Bateman | 340/970 |
| 5,936,552 A | * | 8/1999 | Wichgers et al. | 340/963 |
| 6,628,278 B1 | * | 9/2003 | Ritter | 345/419 |
| 6,678,588 B2 | * | 1/2004 | He | 701/3 |
| 6,690,299 B1 | * | 2/2004 | Suiter | 340/973 |
| 6,842,122 B1 | * | 1/2005 | Langner et al. | 340/945 |
| 6,985,801 B1 | * | 1/2006 | Straub et al. | 701/3 |
| 7,280,896 B2 | * | 10/2007 | Morizet et al. | 701/3 |
| 7,603,209 B2 | * | 10/2009 | Dwyer et al. | 701/14 |
| 2004/0174275 A1 | * | 9/2004 | Coppolino | 340/945 |
| 2004/0225420 A1 | * | 11/2004 | Morizet et al. | 701/3 |

* cited by examiner

*Primary Examiner*—Brian A Zimmerman
*Assistant Examiner*—An T Nguyen
(74) *Attorney, Agent, or Firm*—Dickinson Wright PLLC

(57) ABSTRACT

A display system includes information sources containing information relating to an aircraft and its surrounding environment. A processor constructs a three-dimensional synthesis image of the aircraft environment, using the information from the information sources, so as to display the position of the aircraft, the environment through which the aircraft is moving, and the terrain to be flown over. The synthesis image is coherent with information relating to another display. A display unit displays the synthesis image on one area of a display screen.

10 Claims, 2 Drawing Sheets

DISPLAY SYSTEM FOR AIRCRAFT

FIELD OF THE INVENTION

The present invention relates to a display system for an aircraft, in particular a civil transport airplane.

More precisely, said display system is intended in particular to construct an image of the environment of the aircraft and to present it to at least one pilot of said aircraft.

BACKGROUND OF THE RELATED ART

It is known that the navigation and the operation of aircraft, in particular of civil transport airplanes, may produce significant workloads for the crews and the air traffic control. In particular, certain phases or conditions of flight may be propitious to a more or less significant lapse of concentration of pilots. The complex synthesis of the piloting and navigation data and of the states of the systems of the aircraft may then not be performed in an optimal and complete manner. The construction of false mental images of the actual situation of the aircraft in space may give rise to untimely or erroneous judgments and behaviors.

The construction of false mental images may in particular be due to inconsistencies, or more frequently to inhomogeneities (of size, of color, etc.) existing in various displays which are presented to the pilot, in particular when these displays are of different types, for example of different numbers of dimensions.

SUMMARY OF THE INVENTION

The subject of the present invention is a display system for aircraft, which makes it possible to remedy these drawbacks.

For this purpose, according to the invention, said display system, of the type comprising a display device comprising:
  information sources containing information relating to the aircraft and to its environment;
  information processing means capable of constructing an image of the environment of the aircraft, on the basis of information emanating from said information sources; and
  display means comprising at least one visualization screen, is noteworthy in that said information processing means construct a synthesis image in three dimensions (3D) so as to visualize the position of the aircraft, as well as the environment in which this aircraft is deploying and comprising in particular the terrain to be overflown, said synthesis image being consistent at least with information relating to another display, for example in two dimensions (2D), in that said display means present said synthesis image on at least one zone of said visualization screen, and in that said display device is linked to a means capable of effecting said other display.

Preferably, said information processing means construct said synthesis image in three dimensions, according to a viewpoint which is outside the aircraft, in a manner specified hereinbelow. Such a three-dimensional image is directly and intuitively accessible for the pilots, without particular effort.

Moreover, by virtue of the invention, the synthesis image in three dimensions, constructed and presented, is consistent with at least one other display (for example in two dimensions) of the aircraft, which is moreover of different type (two dimensions instead of three dimensions).

The display system in accordance with the invention thus makes it possible to aid the pilots to apprehend the position of the aircraft in its environment. It affords a valuable aid to the awareness of the actual situation of the aircraft in relation to the terrain, in particular by virtue of the consistency of the three-dimensional image presented with information relating to at least one other type of display, and it thus increases flight comfort and safety.

More particularly, although not exclusively, the information relating to said other display emanates from a collision warning device which makes it possible to emit a warning signal, in case of risk of collision of the aircraft with the terrain. Concerning the collision warning device, it may in particular be a device of TAWS type ("Terrain Awareness and Warning System"), of EGPWS type ("Enhanced Ground Proximity Warning System") or of GCAS type ("Ground Collision Avoidance System").

In a first particular embodiment, the display system in accordance with the invention furthermore comprises such a collision warning device relating to the terrain, which is capable of effecting said other display.

Furthermore, in particular to increase the consistency between the synthesis image in three dimensions presented by said display device and said other display effected by said collision warning device, advantageously:
  a) said display device and said collision warning device use the information from one and the same database containing data relating to the terrain; and/or
  b) said collision warning device determines (in standard fashion), as appropriate, zones of potential impact of the aircraft with the terrain overflown and transmits them to said display device which integrates these zones of potential impact into said synthesis image; and/or
  c) said collision warning device uses (in standard fashion) a particular apportionment of various colors for said other display (particularly of said zones of potential impact) and transmits this particular apportionment of colors to said display device which uses it in the display of said synthesis image in three dimensions.

In a second particular embodiment (which may be combined with said first aforesaid embodiment), said visualization screen is a navigation screen which comprises at least two different display zones, arranged vertically one above the other, namely a first upper zone for effecting said other display, and a second lower zone for displaying said synthesis image in three dimensions.

Preferably, the ratio between the height of said first zone and the height of said second zone lies in an interval equal to [2; 3].

Moreover, advantageously, said display system displays on said first upper zone at least one terrain image, which emanates from a collision warning device, in particular of the aforesaid type.

It will be noted that the linkage in accordance with the invention between the display device and the means intended to effect said other display (namely the collision warning device in the first aforesaid embodiment and the first upper zone of the visualization screen in the second aforesaid embodiment) is obtained:
  in said first embodiment:
    by way of the identical database used, in the aforesaid example a); and
    by way of a physical link for information transmission, in the aforesaid examples b) and c); and
  in said second embodiment, by the integration of said first upper zone of display into the visualization screen of said display device.

Moreover, advantageously, said information processing means use an amplified altitude to construct a representation of the terrain on said synthesis image, this amplified altitude corresponding to the effective terrain altitude received from said information sources, which is multiplied by a coefficient k whose value lies in an interval substantially equal to [1; 2]. Preferably, the coefficient k is substantially equal to 1.4. The application of such a multiplier coefficient makes it possible to amplify the altitudes and consequently to improve the perception of reliefs.

Furthermore, advantageously, said information processing means use, to construct said synthesis image in three dimensions, parameters (evidencing the perspective of the terrain on said synthesis image), which depend on the display mode and on the display scale that are used for said other image.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
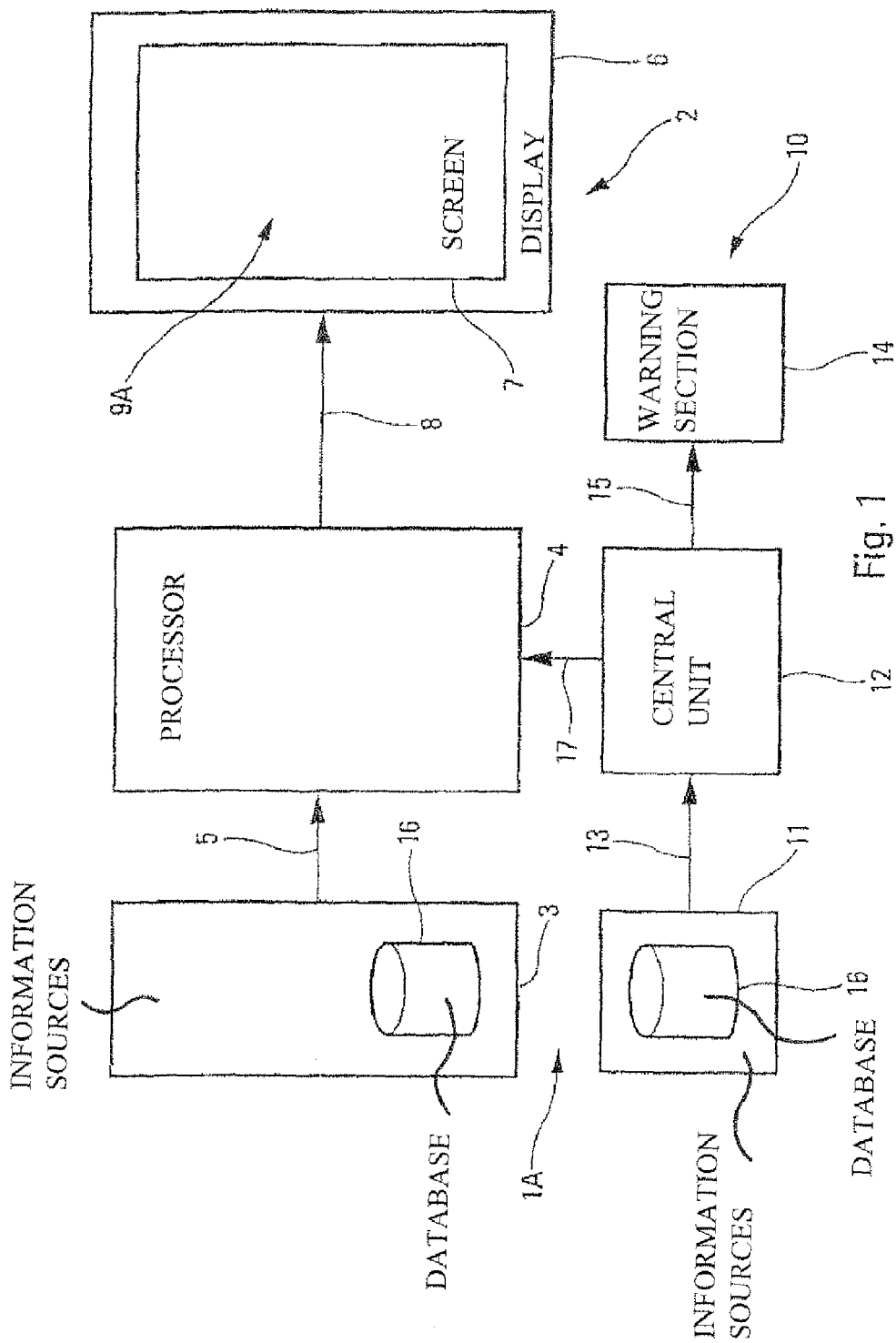
FIGS. 1 and 2 are the schematic diagrams of two different embodiments of a display system in accordance with the invention.
Figure 2:
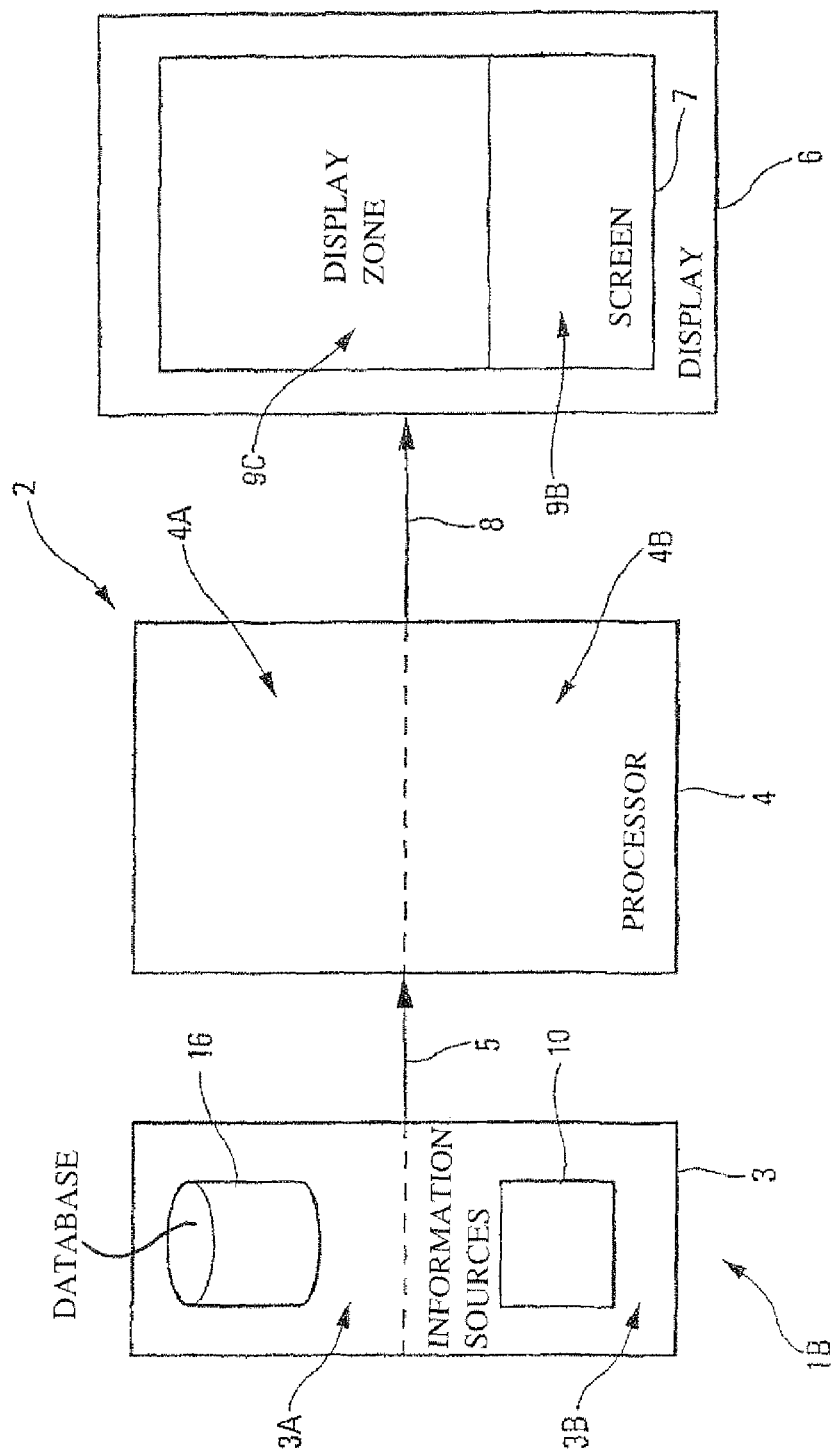

The display system in accordance with the invention and represented according to two embodiments 1A and 1B respectively in FIGS. 1 and 2 is intended in particular to construct an image of the environment of an aircraft and to present it to at least one pilot of said aircraft, in particular of a transport airplane.

Said display system 1A, 1B is of the type comprising at least one display device 2 comprising:
  information sources 3 containing information relating to the aircraft and to its environment;
  information processing means 4 which are connected to said information sources 3 by way of a link 5 and which are capable of constructing an image of the environment of the aircraft on the basis of information emanating from said information sources 3; and
  display means 6 comprising at least one visualization screen 7, and connected to said information processing means 4 by way of a link 8.

According to the invention, said information processing means 4 construct a synthesis image in three dimensions to visualize the position of the aircraft, as well as the environment in which this aircraft is deploying and comprising in particular the terrain to be overflown, said synthesis image being consistent with information relating to at least one display in two dimensions, and said display means 6 present said synthesis image in three dimensions on at least one zone 9A, 9B of said visualization screen 7.

Preferably, said information processing means 4 construct said synthesis image in three dimensions, according to a viewpoint which is outside the aircraft, in a manner specified hereinbelow. Such a three-dimensional image is directly and intuitively accessible for the pilots, without particular effort.

Moreover, by virtue of the invention, the synthesis image in three dimensions, constructed and presented, is consistent with at least one other display (in two dimensions) of the aircraft, which is moreover of different type (two dimensions instead of three dimensions).

The display system 1A, 1B in accordance with the invention makes it possible therefore to aid the pilots to apprehend instantaneously the position of the aircraft in its environment. It affords a valuable aid to the awareness of the situation of the aircraft in relation to the terrain and increases flight comfort and safety.

More particularly, although not exclusively, the information relating to a display in two dimensions emanates from a collision warning device 10 which emits a visible and/or audible warning signal, in case of risk of collision of the aircraft with the terrain overflown. Concerning the collision warning device 10, it may in particular be a device of TAWS type ("Terrain Awareness and Warning System"), of EGPWS type ("Enhanced Ground Proximity Warning System") or of GCAS type ("Ground Collision Avoidance System").

Such a collision warning device 10 is generally able to produce two warning signals relating to different levels of warning, namely a caution and a warning. Generally, a caution is emitted around 60 seconds before a potential collision of the aircraft with the terrain, when the risk of such a collision is detected. If this risk of collision is still evident 30 seconds before the envisaged impact of the aircraft with the terrain, said collision warning device 10 emits a warning. Of course, in case of warning, the pilot must react immediately. On the other hand, in case of caution, the pilot of the aircraft is supposed to verify the reality of the potential risk of collision with the terrain and modify the trajectory thereof if this risk is evident, so as to avoid such a collision.

In the first particular embodiment represented in FIG. 1, the display system 1A in accordance with the invention comprises, in addition to the aforesaid elements, such a collision warning device 10 relating to the terrain, capable of effecting said aforesaid display in two dimensions.

This collision warning device 10 comprises in standard fashion:
  a set 11 of information sources;
  a central unit 12 which is connected by a link 13 to said set 11 and which effects the various processing operations; and
  a means of warning 14 comprising for example a visualization screen (not represented), which is connected by a link 15 to said central unit 12 and which emits as appropriate a warning signal of the aforesaid type.

In a preferred embodiment, said display device 2 and said collision warning device 10 use the information of one and the same database 16 containing data relating to the terrain, to construct the images of the terrain in 3D and in 2D which are presented respectively by said display means 6 and said warning means 14. One is thus ensured of consistency of the terrain-related information which is presented by these means 6 and 14.

In this case, said database 16 forms part of the information sources 3 of the display device 2 and of the set 11 of information sources of the collision warning device 10, as is represented in FIG. 1. It will be noted moreover that said information sources 3 moreover comprise, for example, sensors, computers, onboard systems, etc., which provide information relating to the aircraft and to its environment.

Furthermore, to increase yet further the consistency between the synthesis image in three dimensions presented by the display device 2 and the display in two dimensions envisaged by the collision warning device 10:
  said collision warning device 10 determines in standard fashion (on the basis of predictive calculations of the trajectory of the aircraft) zones of potential impact of the aircraft with the terrain overflown and it transmits them by way of a link 17 to said information processing means 4 which integrate these zones of potential impact into said synthesis image which is presented on the visualization screen 7; and said collision warning device 10 uses in standard fashion a particular apportioning of various colors for the display in two dimensions, in particular as regards said zones of potential impact, and it transmits this particular apportionment of colors by way of the link 17 to said information processing means 4 which use it in a similar manner in the display of said synthesis image (in three dimensions) on the visualization screen 7.

Generally, a collision warning device 10 uses as input a terrain elevation grid and gives as output a grid of so-called "labels", and it associates with each label a color (and/or a texture) on the 2D image which it presents. Thus, by way of example, a caution may be associated with an amber color, and a warning may be associated with a red color. By virtue of the coupling in accordance with the invention of said devices 2 and 10, the colors (and/or textures) for the synthesis image and for the 2D display may be the same (as already indicated) or mutually consistent colors (and/or textures).

Thus, if there exists a zone of potential conflict, an alarm may be signaled on the 3D synthesis image. For example, this zone of potential conflict may be colored in a warning fashion. The display of this zone may also flash and its frequency of flashing may be all the higher the closer said zone of conflict is to the aircraft.

It will be noted that in the example of FIG. 1, the display zone 9A (for displaying the synthesis image) corresponds to the whole visualization screen 7. The display (or the presentation) of said synthesis image on the visualization screen 7, which is for example situated in the flight deck of the aircraft, makes it possible to improve the awareness that the pilot has of the effective situation of the aircraft A. This visualization screen 7 may be a specific screen or a screen already existing on the aircraft.

In a second particular embodiment represented in FIG. 2 (whose characteristics may be combined with those of said first embodiment of FIG. 1), said visualization screen 7 is a standard navigation screen, of ND type ("navigation display"), which comprises at least two different display zones 9B and 9C, arranged vertically one above the other, namely a first upper zone 9C for effecting said display in two dimensions, and a second lower zone 9B for displaying said synthesis image in three dimensions.

The display means 6 display on said upper zone 9C a 2D image which comprises standard navigation information (flight plan, speed and direction of the wind, etc.), weather information, etc., as well as a terrain image which emanates from a collision warning device 10 of the aforesaid type.

The information which is identical on the two display zones 9B and 9C emanates from like processing units and/or like information sources. Also, within the framework of the present invention, to effect these two displays, said display system 1B may comprise:

information sources 3 and information processing means 4, unique and common to the two zones 9B and 9C; or information sources 3A and 3B that are differentiated (and associated respectively with the zones 9B and 9C), but information processing means 4, which are unique and common to said zones 9B and 9C; or information sources 3 which are unique and common to said zones 9B and 9C, and information processing means 4A and 4B which are differentiated (and associated respectively with said zones 9B and 9C).

Furthermore, the ratio between the height of said upper zone 9C and the height of said lower zone 9B lies in an interval equal to [2; 3]. Preferably:

on a 6"×8" screen of the type used on Airbus A380, the apportionment of the 8"s is preferably 6" (zone 9C) and 2" (zone 9B); and on a 6"×6" screen of the type used on Airbus A318, A319, A320, A321, A330 and A340, the apportionment of the 6"s is preferably 4" (zone 9C) and 2" (zone 9B).

Moreover, advantageously, said information processing means 4 use an amplified altitude to construct a representation of the terrain on said 3D synthesis image. This amplified altitude corresponds to the effective terrain altitude (received from said information sources 3), which is multiplied by a coefficient k whose value lies in an interval substantially equal to [1; 2]. Preferably, the coefficient k is substantially equal to 1.4. The application of such a multiplier coefficient makes it possible to slightly amplify the altitudes and consequently to improve the perception of reliefs.

Furthermore, advantageously, said information processing means 4 use, to construct said synthesis image in three dimensions, parameters $\alpha$, $\beta$, ... (specified hereinbelow and making it possible to evidence the perspective of the terrain on said synthesis image) which depend on the display mode (for example a so-called "ARC" mode or a so-called "ROSE" mode) and on the display scale ("range") that are used for said display in two dimensions.

By virtue of the invention, the representation illustrating the terrain on said synthesis image is a realistic and intuitive representation, which favors an immediate grasping of awareness of the actual geography.

Described hereafter is a preferred embodiment for constructing said synthesis image in three dimensions.

According to this preferred embodiment, said information processing means 4 implement a method comprising the series of following steps consisting in:

a) determining a first straight line passing through the location of the aircraft and forming a first angle of lateral separation $\alpha$ and a first angle of vertical separation $\beta$ with the course of the aircraft;

b) determining a first point which is situated on said first straight line to the rear of the aircraft at a distance such that the vertical projection of this first point on the horizontal plane passing through the location of the aircraft is situated at a predetermined distance L1 from said location of the aircraft;

c) determining a line of aim passing through said first point and forming a second angle of lateral separation va and a second angle of vertical separation vb with a second straight line passing through said first point and parallel to said course of the aircraft;

d) defining a plane of projection which is orthogonal to said line of aim;

e) constructing an image of at least one part of the environment at least at the front of the aircraft, with the aid of a conical projection onto said plane of projection taking account of said first point as reference point of the projection;

f) laterally delimiting said image by two vertical straight lines cutting respectively the horizon line of the image at second and third points which are such that, on the one hand, the angle between the line of aim and a third straight line passing through said first and second points corresponds to a predetermined angle and, on the other hand, the angle between the line of aim and a fourth straight line passing through said first and third points corresponds to a predetermined angle;

g) adapting the scale of the image thus delimited so as to make the straight line segment which is formed by said second and third points and which defines the width of the image correspond to the width of a visualization screen on which one wishes to present said image, and this image is delimited vertically as a function of the height of said visualization screen; and h) transmitting the image thus constructed (which represents a synthesis image in three dimensions) to said display means 6 so that they present it on said display zone 9A, 9B of said visualization screen 7.

In a particular embodiment:

said first angle of lateral separation α lies between 6° and 15°;

said first angle of vertical separation β lies between 3° and 10°;

said predetermined distance L1 lies between 3 and 20 kilometers;

said second angle of lateral separation va is less than or equal to said first angle of lateral separation α;

said second angle of vertical separation vb is less than or equal to said first angle of vertical separation β.

Furthermore, in a particular embodiment, said visualization screen 7 is provided with a heading scale and said angles between the line of aim and said third and fourth straight lines are such that the angular deviation on the heading scale between said second and third points lies between 40° and 140°. Moreover, in step g), the image is delimited vertically so that the horizon line of said image is situated in the upper third of said display zone 9A, 9B of the visualization screen 7. Furthermore, in step e), only an image of the environment which is situated up to a predetermined distance in front of the aircraft is constructed.

In a preferred embodiment of the invention, the image constructed in step e) comprises at least the following elements:

a first symbol representing the aircraft and indicating its location;

a representation illustrating the terrain;

a vertical reference stroke between said symbol of the aircraft and its vertical projection on said terrain; and a first plot representing the future trajectory of the aircraft.

Thus, the image constructed makes it possible to improve the awareness of the pilot of the overall situation of the aircraft, in particular vis-à-vis the outside environment, and of the future trajectory thereof with respect to this outside environment.

Furthermore, the image constructed in step e) moreover comprises:

a second plot representing the vertical projection on said terrain of the future trajectory of the aircraft;

a plurality of vertical strokes between points situated on said first plot representing the future trajectory of the aircraft and the corresponding vertical projections. Preferably, at least one of said vertical strokes comprises an indication of safety altitude;

a heading scale represented above the horizon line;

a flight plan; and supplementary information, for example information on the air traffic or the weather.

Moreover, said vertical reference stroke comprises a scale and/or an indication of safety altitude. Furthermore, said first symbol representing the aircraft is representative of the attitudes of the aircraft in terms of roll, pitch and yaw, and said representation illustrating the terrain may be colored as a function of the deviation between the altitude of the aircraft and the altitude of said terrain.

The display system 1A, 1B in accordance with the invention make it possible to aid pilots to instantaneously apprehend the position of the aircraft in its environment, at the present instant and within the forthcoming minutes. It affords a valuable aid to the awareness of the situation of the aircraft in relation to the terrain and increases flight comfort and safety. Specifically, said display system 1A, 1B makes it possible to present intuitive and instinctive information to pilots, requiring no mental effort in order to be processed. The information medium used offers a synthetic and immediate picture. The 3D representation produced improves awareness of the overall situation for pilots.

The invention claimed is:

1. A display system for an aircraft, said display system comprising a display device, comprising:

information sources including information relating to the aircraft and to its environment;

a processor that constructs an image of the environment of the aircraft on the basis of information emanating from said information sources, said processor constructing a synthesis image in three dimensions so as to visualize the position of the aircraft, as well as the environment in which this aircraft is deploying and comprising the terrain to be overflown;

a display device comprising at least one visualization screen, and presenting said synthesis image on at least one zone of said visualization screen, wherein:

said synthesis image is consistent at least with information relating to another display, said display device is linked to said other display, and said processor utilizes an amplified altitude to construct a representation of the terrain on said synthesis image, said amplified altitude corresponding to the effective terrain altitude received from said information sources, which is multiplied by a coefficient k whose value lies in an interval substantially equal to [1; 2]; and a collision warning device relating to the terrain to effect said other display, wherein said display device and said collision warning device use information from a database including data relating to the terrain, wherein said processor:

determines a first straight line passing through the location of the aircraft and forming a first angle of lateral separation and a first angle of vertical separation with the course of the aircraft;

determines a first point which is situated on said first straight line to the rear of the aircraft at a distance such that the vertical projection of the first point on the horizontal plane passing through the location of the aircraft is situated at a predetermined distance form said location of the aircraft;

determines a line of aim passing through said first point and forming a second angle of lateral separation and a second angle of vertical separation with a second straight line passing through said first point and parallel to said course of the aircraft;

defines a plane of projection which is orthogonal to said line of aim;

constructs an image of at least one part of the environment at least at the front of the aircraft with the aid of conical rejection onto said plane of projection taking account of said first point as reference point of the projection;

laterally delimits said image by two vertical straight lines cutting respectively the horizon line of the image at second and third points which are such tat, on the one hand, the angle between the line of aim and a third straight line passing through said first and second points corresponds to a predetermined angle and, on the other hand, the angle between the line of aim and a fourth straight line passing through said first and third points corresponds to a predetermined angle;

adapts the scale of the image thus delimited so as to make the straight line segment which is formed by said second and third points and which defines the width of the image correspond to the width of a visualization screen on which one wishes to present said image, and the image is delimited vertically as a function of the height of said visualization screen; and transmits the image thus constructed to said display means so that they preset it on said display zone of said visualization screen.

2. The display system as claimed in claim 1, wherein said other display is a display in two dimensions.

3. The display system as claimed in claim 1, wherein said processor constructs said synthesis image in three dimensions, according to a viewpoint which is outside the aircraft.

4. The display system as claimed in claim 1, wherein said collision warning device determines, as appropriate, zones of potential impact of the aircraft with the terrain overflown and transmits them to said display device which integrates these zones of potential impact into said synthesis image.

5. The display system as claimed in claim 1, wherein said collision warning device uses a particular apportionment of various colors for said other display and transmits this particular apportionment of colors to said display device which uses it in the display of said synthesis image in three dimensions.

6. The display system as claimed in claim 1, wherein said visualization screen is a navigation screen which comprises at least two different display zones, arranged vertically one above the other, namely a first upper zone for effecting said other display, and a second lower zone for displaying said synthesis image in three dimensions.

7. The display system as claimed in claim 6, wherein the ratio between the height of said first zone and the height of said second zone lies in an interval equal to [2; 3].

8. The display system as claimed in claim 6, wherein it displays on said first upper zone at least one terrain image, which emanates from a collision warning device.

9. The display system as claimed in claim 1, wherein said processor utilizes, to construct said synthesis image in three dimensions, parameters evidencing the perspective of the terrain on said synthesis image, which depend on the display mode and on the display scale that are used for another image.

10. The display system as claimed in claim 1, wherein
said visualization screen is a navigation screen which comprises at least two different display zones, arranged vertically one above the other, namely a first upper zone for effecting said other display, and a second lower zone for displaying said synthesis image in three dimensions,
the display displays on said first upper zone at least one terrain image, which emanates from a collision warning device, and
the synthesis image emanates from at least one of common processing units and information sources.

* * * * *